Patented Sept. 3, 1946

2,407,129

UNITED STATES PATENT OFFICE 2,407,129

PROCESS OF HALOGENATION

Anthony F. Benning, Woodstown, N. J., and Joseph D. Park, Wilmington, Del., assignors to Kinetic Chemicals, Inc., Wilmington, Del., a corporation of Delaware No Drawing. Application March 14, 1944, Serial No. 526,475

3 Claims. (Cl. 260—653)

A. This invention relates to the preparation of halogenated aliphatic hydrocarbons and, in particular, to halogenated derivatives of methane.

B. It is an object of the invention to prepare halogenated derivatives of methane in which the halogens are fluorine, chlorine, or both. Another object of the invention is to prepare such compounds, many of which are disclosed in the prior art, by a process having great advantages over the prior art processes of preparing these compounds.

C. The objects of the invention are accomplished, generally speaking, by reacting methane simultaneously with chlorine and hydrogen fluoride in the vapor phase in the presence of a catalyst. The preferred catalyst is $CrF_3$.

D. According to the commercial process of preparing fluorinated derivatives of saturated aliphatic hydrocarbons, one use of which is as refrigerants, the compounds are made from chlorinated hydrocarbons using HF as a source of fluorine and antimony halides as catalysts or fluorine carriers. That operation is virtually an exchange reaction carried out in the liquid phase with the substitution of chlorine by fluorine. The hydrocarbon which is fluorinated must, according to the teaching of the prior art and according to the nature of the prior art process, be chlorinated before it can be fluorinated.

E. According to our invention, a saturated hydrocarbon is simultaneously chlorinated and fluorinated in a single step process which has great advantage over the processes known to the prior art. This process is carried out on methane with HF and chlorine together in the presence of chromium fluoride. In the prior art process it has been theoretically stated that the so-called catalyst is more a fluorine carrier than a true catalyst. In this case the chromium fluoride has no substantial action upon methane or even upon chlorinated methane. It is, therefore, apparently a true catalyst. This process is carried out in the vapor phase.

F. The chromium fluoride catalyst may be impregnated in a carbon carrier. It is prepared by methods of impregnation which will be understood by persons skilled in the art. The products of the reaction contain a number of compounds together with unconverted reactants. The components in the reaction product may be separated in the manner herein set forth, or by any other satisfactory process of separation.

G. While this invention is susceptible of considerable variation and modification in the manner of its practical application, particularly in the proportions of the reactants, the temperature, the pressure, and the exact method of procedure, the following examples, in which the parts are by weight, will serve to illustrate its practical application.

Example I

About 100 parts of activated carbon were impregnated with 35 parts of $CrF_3$ by slurrying $CrF_3$ with ether and pouring carbon into the slurry. The solvent was then removed by heating at 275–300° C. for several hours in the vacuum. The material thus treated was placed in an inconel-jacketed carbon tube and heated to 275–300° C. Through this tube was then passed a mixture of $CH_4$, HF and chlorine, in the following ratios:

| | Parts by weight |
|---|---|
| $CH_4$ | 4 |
| Chlorine | 60 |
| HF | 30 |

It is advisable to first start the flow of $CH_4$, followed by HF and then by chlorine. The contact time was about two minutes. The reaction proceeded very smoothly and at the end of 3¾ hours the reaction was discontinued. An integrating wet-test meter indicated that 15.6 parts of methane had passed through the reaction tube. The effluent gas mixtures were led through a copper flask (serving as a trap) into a scrubbing and drying system. The dried gases were passed through a series of receivers cooled respectively with carbon dioxide ice in acetone and with liquid nitrogen. The pressure in the reaction zone was maintained at about 1 atm. abs. by means of a pressure regulator at the end of the system. In the liquid nitrogen trap, 12 parts of methane were collected. The carbon ice-acetone cooled trap contained 20.8 parts of material which had the following composition, obtained by Podbielniak distillation:

| | | |
|---|---|---|
| $CHClF_2$ | parts | 0.4 |
| $CCl_2F_2$ | do | 6.4 |
| $CCl_3F$ | do | 2 |
| $C_2Cl_3F_3$ | do | 2 |
| $CCl_4$ | do | 8 |
| $C_2Cl_6$ | do | 2 |
| Organic loss | percent mole | 6 |
| Conversion to fluorine compounds | do | 9.6 |
| Yield of fluorinated compounds | do | 42 |

It will be observed not only that there were four compounds containing both chlorine and fluorine in the product of reaction, but that the method produced some carbon tetrachloride and some perchlorethane.

*Example II*

A steel-jacketed carbon tube (with the jacket electrically insulated from the carbon tube) filled with activated carbon impregnated with $CrF_3$ (10% $CrF_3$ on carbon) was used. This tube was electrically heated, the ends of the carbon tube serving as electrodes. At a tube temperature of 340° C. the flow of $CH_4$, HF and $Cl_2$ was started in the order named, at the same ratio as that used in Example I. A contact time of about three minutes was approximated. 42 parts of material were collected in a carbon ice trap and none in the liquid nitrogen trap. Substantially all of this material was found to be $CCl_2F_2$ upon distillation with the Podbielniak apparatus. No $CCl_3F$ was found.

H. Super-atmospheric or sub-atmospheric pressures may be used in carrying out this invention although atmospheric pressure, in general, is preferred. The ratio of the various reactants may be varied within wide limits depending upon the fluorinated derivative of methane desired. We have found the conditions used in Example II to be preferred for the production of $CCl_2F_2$. By proper selection of the ratios of the various reactants and the conditions of reaction, it is possible to selectively produce a predominant quantity of any compound which forms a constituent of the reaction product.

I. The reaction temperature may also be varied over a wide range although temperatures above 550° C. are not suitable. The temperature range from 275° to 400° C. is to be preferred. For the manufacture of $CCl_2F_2$ temperatures above 300° C. are preferred.

J. The reaction time necessary may also be varied depending upon the temperature of the catalyst and on the particular derivative wanted. However, in general, for the production of $CCl_2F_2$ a catalyst temperature between 325°–450° C. and contact times greater than 30 seconds will furnish the most satisfactory yields.

K. A suitable catalyst may be prepared from an aqueous solution of chromic chloride by impregnation on carbon and then drying in vacuo or in a stream of nitrogen heated to above 200° C. The proportion of the catalyst to carbon (chromium salt) may also be varied. In this invention 5–15% of $CrF_3$, based on the weight of carbon, has been satisfactorily used. The carbon may be directly impregnated with $CrF_3$ by pasting the material with ether or some other inert solvent and then drying the mixture in a current of inert gas, e. g., nitrogen, at temperatures of 350–400° C. Other catalyst supports may be used.

L. The reaction products including the unchanged starting materials may be treated to isolate the fluoro derivatives either by absorption of the inorganic materials in water or by condensation and fractional distillation of the reaction mixture. The unchanged $CH_4$, $Cl_2$, and HF may be recycled.

M. A particular advantage of the invention is that methane can be directly fluorinated. Another advantage of the invention is in the direct production from methane of $CCl_2F_2$, a very valuable compound. Another advantage of the invention lies in this that methane is a much cheaper starting material than the chlorinated materials which were necessary to fluorination by the processes of the prior art. A surprising feature of the invention is that the antimony catalysts which are useful in the processes of the prior art are ineffective in this process. Another advantage of the invention is that in the preparation of $CCl_2F_2$ yields of the order of 35% were obtained. Other catalysts which are useful in the older processes of preparing such compounds have been tried and found ineffective. Another advantage of the invention is the provision of a new process for preparing the valuable compound $CHClF_2$ which has heretofore been prepared only by the fluorination of chloroform with fluorinating catalysts such as Sb halides and mercury fluorides.

N. As many apparently widely different embodiments of this invention may be made without departing from the spirit and scope thereof, it is to be understood that we do not limit ourselves to the specific embodiments thereof except as defined in the appended claims.

We claim:

1. A process for the preparation of halogenated saturated aliphatic hydrocarbons which comprises reacting hydrogen fluoride and chlorine simultaneously with methane at a temperature of 325° to 450° C. in the presence of chromium fluoride and separating the products by distillation.

2. A process for the preparation of difluorodichloro-methane which comprises reacting hydrogen fluoride and chlorine simultaneously with methane in the presence of chromium fluoride at a temperature of about 340° C. and separating the products by distillation.

3. A process for the preparation of halogenated derivatives of hydrocarbons which comprises reacting hydrogen fluoride and chlorine simultaneously with methane in the presence of chromium fluoride at a temperature between about 275° and 550° C. and separating the products by distillation.

ANTHONY F. BENNING.
JOSEPH D. PARK.